United States Patent [19]

Hanning et al.

[11] Patent Number: 4,968,272
[45] Date of Patent: Nov. 6, 1990

[54] PROTECTIVE CONDUCTOR CONNECTOR

[75] Inventors: Walter Hanning, Hiddenhausen; Jürgen Pampel, Bad Salzflen; Ferdinand Steinkuhle, Paderborn-Wewer; Manfred Wilmes, Detmold, all of Fed. Rep. of Germany

[73] Assignee: C.A. Weidmüller GmbH & Co., Fed. Rep. of Germany

[21] Appl. No.: 475,876

[22] Filed: Feb. 6, 1990

[30] Foreign Application Priority Data

Mar. 28, 1989 [EP] European Pat. Off. ........ 89105408.2

[51] Int. Cl.$^5$ ................................. H01R 9/26
[52] U.S. Cl. .................... 439/716; 439/431; 439/532
[58] Field of Search ............. 439/716, 717, 723, 724, 439/790, 791, 792, 811, 815, 94, 532, 431

[56] References Cited

FOREIGN PATENT DOCUMENTS

| 2461331 | 7/1976 | Fed. Rep. of Germany | 439/717 |
|---|---|---|---|
| 2941932 | 5/1981 | Fed. Rep. of Germany | 439/717 |
| 2845532 | 6/1982 | Fed. Rep. of Germany | |
| 3126535 | 6/1984 | Fed. Rep. of Germany | |
| 3339365 | 9/1985 | Fed. Rep. of Germany | |
| 3526494 | 1/1987 | Fed. Rep. of Germany | 439/716 |

Primary Examiner—David L. Pirlot
Assistant Examiner—Hier D. Vir
Attorney, Agent, or Firm—Laubscher, Presta & Laubscher

[57] ABSTRACT

A protective conductor connector for an electrical terminal having a housing mounted on the leg portion of a support rail is characterized by a slider provided between the terminal clamping screw and the rail. The slider is arranged within a terminal carrier and includes a clamping surface arranged beneath the clamping screw and a toothed clamped zone arranged above the rail leg portion. The slider also includes inclined guide surfaces which are guided by projections of the terminal housing during clamping movement of the slider. When the clamping screw is operated, the slider is displaced vertically and horizontally to clamp the conductor against the slider clamping surface and to scratch through a corrosion protective coating on the rail leg portion, thereby providing a reliable electrical connection between the conductor and the rail regardless of the diameter of the conductor.

4 Claims, 1 Drawing Sheet

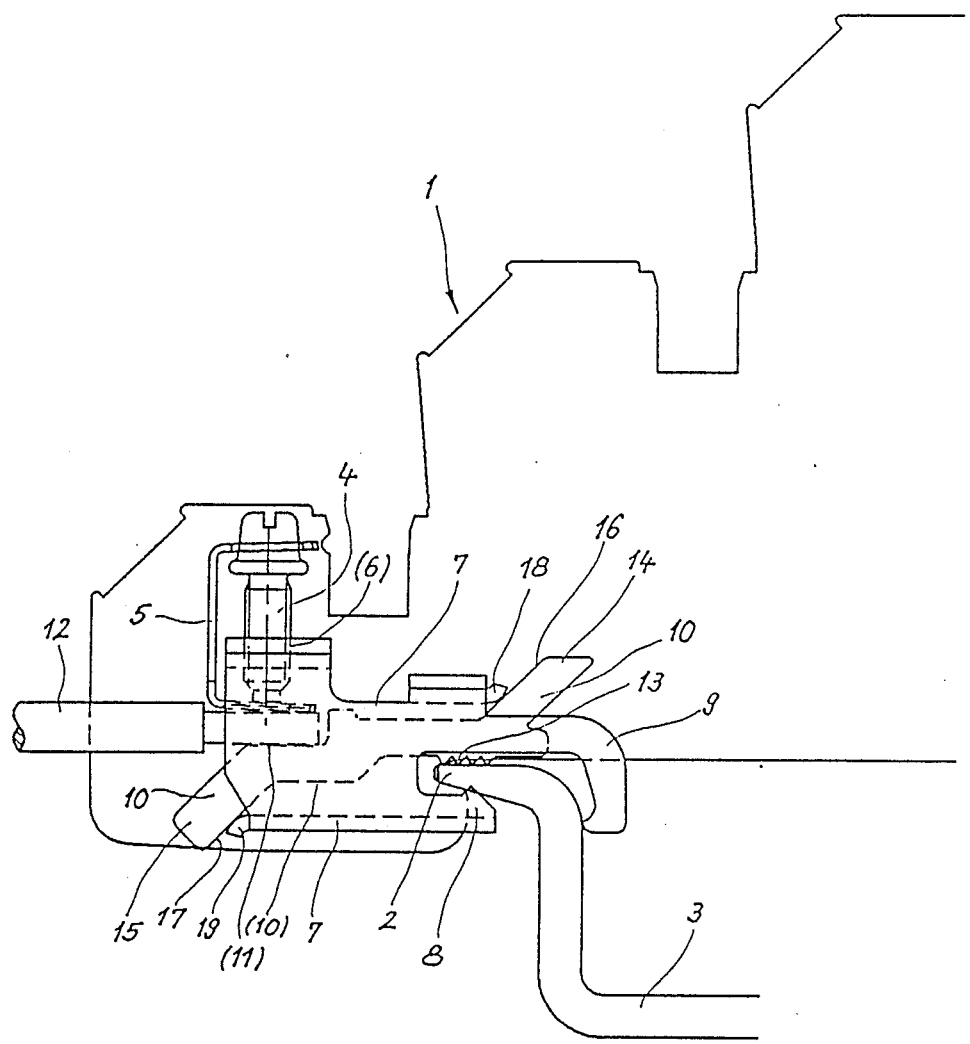

_PROTECTIVE CONDUCTOR CONNECTOR_

_BACKGROUND OF THE INVENTION_

The present invention relates to a protective conductor connector for connecting a conductor with a support rail. More particularly, the connector is part of a multi-tiered electrical terminal which is mounted on a leg portion of the support rail.

_BRIEF DESCRIPTION OF THE PRIOR ART_

Protective conductor connectors are well-known in the patented prior art, as evidenced by DE-C-28 45 532. These connectors provide a reliable clamping force that is independent of the diameter of the conductor being connected. When such connectors are used in connection with support rails having an externally offset leg portion of a specified slope, the clamping motion of the connector portion beneath the rail leg portion is skewed. If the clamping zone of the connector is toothed, the corrosion protective layer on the rail leg portion is scratched away resulting in a reliable electrical connection between the conductor and the rail. In order to obtain a reliable connection, the clamping screw of the connector must be arranged above the rail leg portion in the vicinity thereof. This requirement is easily accommodated in single-tiered electrical terminals. However, this requirement is not met in multi-tiered terminals since the bottom region of the terminal housing must project outwardly over the end of the rail leg portion to such an extent that the conductor connector arranged in the lower outer region of the housing is outwardly spaced from the end of the rail leg portion.

In order to overcome this drawback, it is known in the art to provide a contact extension on a connection lever for the connector as shown in DE-C-31 26 535. The lever is clamped on one side by means of the interior of the support rail and has a contact extension in the region above the rail leg portion. The lever is guided by the clamping screw that is laterally spaced from the rail leg portion. As the screw is tightened, the lever is forced against the conductor. The lever thus electrically bridges or connects the conductor and the support rail. However, the contact force is dependent upon the diameter of the conductor. Conductors with larger diameters result in only a small shift of the connection lever, thereby providing only a small contact force. Moreover, because the contact extension of the lever is rounded at the end thereof, a poor electrical connection is provided, especially where the rail leg portion is coated with a layer or film of corrosion preventing material.

In order to provide a reliable contact for the conductor regardless of the diameter thereof, it is known in the art to provide a two-armed rocker arranged between the clamping screw and the rail leg portion as shown in DE-C-33 39 365. When the clamping screw is tightened to connect the conductor, the screw acts on one arm of the rocker. The other arm of the rocker includes a toothed clamping zone which abuts against the lower surface of the support rail leg portion. With this assembly, the contact force is independent of the size of the conductor. However, the overall design of the protective conductor connector is extremely complicated since the rocker is a stamped metal part with punched bearing nubs or tabs and the terminal carrier of the connector must be structurally altered to accommodate the rocker. Furthermore, in the contact zone between the rocker other arm and the rail leg portion, only orthogonal clamping force relative to the rail leg portion is provided. Thus, despite the toothed surface of the rail other arm, there is an inadequate penetration of the corrosion protective coating by the teeth, resulting in a poor connection between the rocker and the rail leg portion.

The present invention was developed in order to overcome these and other drawbacks of the prior connectors by providing a protective conductor connector for an electrical terminal—where the clamping screw is spaced from the support rail leg portion—which provides a reliable electrical connection via a contact force which is independent of the diameter of the conductor being connected with the rail leg portion.

_SUMMARY OF THE INVENTION_

Accordingly, it is a primary object of the present invention to provide a protective conductor connector for an electrical terminal whose housing is adapted for mounting on a leg portion of a support rail. The connector includes a clamping screw connected with the housing and a hollow terminal carrier arranged within the housing. The terminal carrier includes clip portions which extend under and beyond the rail leg portion for mounting the carrier on the leg portion and a pair of projections which extend from diagonally opposite surfaces thereof. A slider is arranged within the terminal carrier for bridging the conductor with the rail leg portion. The slider has a clamping surface arranged between the clamping screw and a toothed clamping zone arranged above the rail leg portion. The slider also has guide surfaces extending at an angle from opposite ends thereof for engaging the terminal projections and guiding the slider downwardly and laterally when the clamping screw is tightened.

In the preferred embodiment of the invention, the contact force applied by the toothed clamping zone of the slider onto the rail leg portion is independent of the diameter of the conductor being connected. Rather, the contact force is defined exclusively by the starting torque of the clamping screw which causes the clamping motion of the slider. The slider is directed downwardly and outwardly by the projections on the terminal carrier and the inclined guide surfaces of the slider. The guide surfaces are contained in parallel planes to provide even clamping movement of the slider. The clamping movement has both vertical and horizontal components. The vertical component causes the slider to be clamped with the rail leg portion. The horizontal component causes the teeth of the slider clamping zone to scratch through the corrosion protection coating, thereby providing a reliable electrical connection.

The protective conductor connector of the invention has a much simpler design than the connectors of the prior art. Small guide projections on the terminal carrier can be easily formed on the stamped terminal carrier during its formation. The slider itself is also a stamped metal part, whereby the guide surfaces can also be integrally formed therewith.

_BRIEF DESCRIPTION OF THE FIGURE_

Other objects and advantages of the present invention will become apparent from a study of the following specification when view in the light of the accompanying drawing which is a cut-away side view of a protective conductor connector according to the invention which is provided in the housing of a multi-tiered electric terminal.

DETAILED DESCRIPTION

The protective conductor connector of the present invention as shown in the drawing is adapted for use in connection with the housing 1 of an electrical terminal which is adapted for mounting on a rail leg portion 2 of a support rail 3.

A clamping screw 4 is arranged within a protective conductor clip 5 of the terminal housing. As shown in the drawing, the clamping screw is spaced from the end of the rail leg portion 2 so that the screw is accessible. This arrangement is necessary in the case of multi-tiered terminals. Otherwise, the clamping screw of an upper tier would be superimposed on the screws and connectors of the lower tiers.

The connector includes a hollow terminal carrier 7 which contains a vertical tapped hole 6 which receives the clamping screw. The terminal carrier 7 extends laterally from the screw 4 to the support rail 3. The carrier is designed to lock the terminal on the rail. Accordingly, the carrier includes a first hook or clip portion 8 which extends beneath the support rail leg portion 2 and a second clip portion 9 which extends above and beyond the leg portion 2 for engaging the rail 3. The first and second clip portions 8, 9 define a jaw, the opening of which has a width designed for mounting the assigned electrical terminal on the rail. The configuration of the jaw opening conforms with the configuration of the rail and leg portion on which the terminal is to be mounted.

Although not shown in the drawing, the other side of the support rail 3 also includes a leg portion on which the assigned electric terminal is fixed. In other terminal designs, it is possible to extend the second clip portion 9 to a position over the entire width of the support rail in such a manner that the clip reaches over the other leg portion (not shown) of the rail.

The invention is characterized by a slider 10 arranged within the terminal carrier 7. The slider extends laterally from beneath the clamping screw 4 to over the support rail leg portion 2. The slider includes a clamping surface 11 arranged opposite the bottom of the clamping screw. The surface 11 is spaced from the screw 4 to receive the conductor 12 to be connected. Thus the clamping surface engages the conductor. At its other end, the slider has a toothed clamping zone 13 that engages the upper surface of the rail leg portion 2.

The slider 10 also includes an inner upwardly directed extension 14 and an outer downwardly directed extension 15 which define guide surfaces 16, 17, respectively. The guide surfaces are arranged in parallel planes. The terminal carrier 7 includes projections such as a rounded strap 18 and a rounded end piece 19 extending from diagonally opposite surfaces thereof. The guide surfaces 16, 17 of the slider are guided by the projections 18, 19 of the terminal carrier 7 during movement of the slider to its connecting position.

With the conductor 12 arranged between the clamping screw 4 and the clamping surface 11 of the slider 10, the clamping screw 4 is tightened to force the conductor 12 and the slider 10 downwardly, whereby the conductor 12 is clamped between the screw and the slider clamping surface. Because of the inclined guide surfaces on the slider, the slider is also displaced laterally as it is forced downwardly by the screw since the guide surfaces 16, 17 slide down the projections on the terminal carrier. The lateral movement of the slider causes the teeth of the slider clamping zone 13 to scratch the layer of corrosion preventing material from the support rail leg portion. This insures that a reliable connection is provided between the conductor and the rail via the slider, regardless of the diameter of the conductor.

While in accordance with the provisions of the patent statute the preferred forms and embodiments have been illustrated and described, it will be apparent to those of ordinary skill in the art that various changes and modifications may be made without deviating from the inventive concepts set forth above.

What is claimed is:

1. In an electrical terminal having a housing adapted for mounting on a support rail having at least one leg portion, a protective conductor connector for connecting a conductor with the support rail, comprising
   (a) a clamping screw connected with the housing,
   (b) a hollow terminal carrier arranged within the housing and including
      (1) clipping means extending under and beyond the rail leg portion for clipping said carrier onto the rail leg portion; and diagonally
      (2) projections extending from opposite surfaces thereof; and
   (c) a slider arranged within said carrier for bridging the conductor with the rail leg portion, said slider including
      (1) a clamping surface arranged beneath said clamping screw and a toothed clamping zone arranged above the rail leg portion; and
      (2) guide means projecting from opposite ends thereof for engaging said terminal projections and guiding said slider downwardly and laterally upon tightening of said clamping screw, whereby when a conductor is inserted between said clamping screw and said slider surface and said clamping screw is tightened, said slider is forced downwardly by said clamping screw and laterally by said guide means which engage said terminal projections, said slider clamping surface engaging said conductor and said slider toothed clamping zone engaging the rail leg to provide a connection between the conductor and the rail.

2. Apparatus as defined in claim 1, wherein said slider guide means comprise inner and outer extensions inclined upwardly and downwardly, respectively, said extensions including guide surfaces arranged in parallel planes.

3. Apparatus as defined in claim 2, wherein said terminal carrier includes an upper bent-over rounded strap defining one of said projections.

4. Apparatus as defined in claim 3, wherein said terminal carrier includes a lower bent-over rounded end piece defining the other of said projections.

* * * * *